US009186923B2

(12) United States Patent
Kim et al.

(10) Patent No.: US 9,186,923 B2
(45) Date of Patent: Nov. 17, 2015

(54) METHOD AND APPARATUS FOR PRODUCING TWO OR MORE PATTERNED SUBSTRATES

(75) Inventors: Dae Hyun Kim, Daejeon (KR); Dongchang Choi, Daejeon (KR); Seung Heon Lee, Daejeon (KR); Mihee Park, Daejeon (KR); U Ra Lee, Daejeon (KR); Wonjoo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 345 days.

(21) Appl. No.: 13/416,088

(22) Filed: Mar. 9, 2012

(65) Prior Publication Data
US 2012/0297996 A1    Nov. 29, 2012

(30) Foreign Application Priority Data

Mar. 9, 2011  (KR) .................. 10-2011-0021131

(51) Int. Cl.
*B41F 3/36* (2006.01)
*B41F 17/26* (2006.01)
*B41M 1/00* (2006.01)
*B41F 13/187* (2006.01)

(52) U.S. Cl.
CPC .. *B41M 1/00* (2013.01); *B41F 3/36* (2013.01); *B41F 17/26* (2013.01); *B41F 13/187* (2013.01); *G06F 2203/04103* (2013.01)

(58) Field of Classification Search
CPC .......... B41F 13/187; B41F 17/14; B41F 3/20; B41F 3/28; B41F 3/36; B41F 17/26; B41F 5/22; B41F 9/01; B41M 1/10; B41M 1/02; B41M 1/06

USPC .................. 101/492, 150, 158, 159
See application file for complete search history.

(56) References Cited

U.S. PATENT DOCUMENTS

| | | | | |
|---|---|---|---|---|
| 5,336,535 A | * | 8/1994 | Fukuchi et al. .............. | 428/1.32 |
| 5,352,634 A | * | 10/1994 | Brody ........................... | 438/478 |
| 5,797,193 A | * | 8/1998 | Amend et al. ................ | 33/614 |
| 6,405,648 B1 | * | 6/2002 | Kinoshita ...................... | 101/170 |
| 7,503,257 B2 | * | 3/2009 | Kim et al. ..................... | 101/216 |
| 7,523,703 B2 | * | 4/2009 | Holm ............................ | 101/375 |
| 2005/0028691 A1 | | 2/2005 | Baek | |
| 2006/0055314 A1 | * | 3/2006 | Nakamura et al. ............ | 313/500 |
| 2006/0186182 A1 | * | 8/2006 | Koyama ........................ | 228/215 |
| 2007/0186791 A1 | * | 8/2007 | Kim et al. ..................... | 101/151 |
| 2008/0148971 A1 | * | 6/2008 | Kim et al. ..................... | 101/216 |
| 2008/0245248 A1 | * | 10/2008 | Takamatsu ................... | 101/217 |
| 2008/0276813 A1 | * | 11/2008 | Chapman ..................... | 101/163 |
| 2010/0159695 A1 | | 6/2010 | Chang et al. | |

(Continued)

FOREIGN PATENT DOCUMENTS

KR  1020090127694 A  12/2009

OTHER PUBLICATIONS

Office Action issued in related Korean Patent Application No. 10-2012-0022920 on Jul. 16, 2013, together with its English Translation, 10 pages.

(Continued)

*Primary Examiner* — Blake A Tankersley
*Assistant Examiner* — John M Royston
(74) *Attorney, Agent, or Firm* — Rothwell, Figg, Ernst & Manbeck, P.C.

(57) ABSTRACT

Provided are a method for producing two or more patterned substrates, which has a simple process and is efficient, and an apparatus for producing two or more patterned substrates.

22 Claims, 14 Drawing Sheets

(56) References Cited

U.S. PATENT DOCUMENTS

2010/0229743 A1* 9/2010 Shin et al. .................. 101/170
2011/0005415 A1 1/2011 Moon et al.
2011/0012842 A1* 1/2011 Lee et al. .................. 345/173

OTHER PUBLICATIONS

Office Action issued in Taiwanese Patent Appln. No. 101107656 on May 9, 2014 along with English translation, 13 pages.

* cited by examiner

1301

METHOD AND APPARATUS FOR PRODUCING TWO OR MORE PATTERNED SUBSTRATES

CROSS-REFERENCE TO RELATED APPLICATIONS

This application claims priority to and the benefit of Korean Patent Application No. 10-2011-0021131 filed in the Korean Intellectual Property Office on Mar. 9, 2011, the entire contents of which are incorporated herein by reference.

TECHNICAL FIELD

The present invention relates to a method for producing two or more patterned substrates, which has a simple process and is efficient, and an apparatus for producing two or more patterned substrates.

BACKGROUND ART

As the new market has been created and the development of technology has progressed in the field of displays, various types of new display products such as LCD, LED, PDP, AMOLED, and the like have been developed.

In particular, in these display products, the mounting of a touch screen together with 3D has already been essentially employed in the display region due to the implementation of a user-centered interface and the implementation of entertainment functions.

The use of the touch screen panel has started from PDAs and now widely used in automated teller machines (ATMs), self-ticketing machines, mobile phones, navigators, weather forecast for televisions, karaoke, game devices for video arcades, and the like.

Examples of touch panels which are a transparent input device include optical-type, capacitive-type, ultrasonic-type, resistive-type, electromagnetic induction-type touch panels, and the like according to the driving principle thereof, and the touch panels are classified per use and characteristics according to the principle thereof, and used.

The resistive-type touch panels are usually used in mobile devices such as mobile phones, game devices, PDA, navigators, and the like, because characteristics such as lightweight, thin type, power saving, low costs, and the like of the resistive-type touch panels are utilized.

Moreover, optical-type, capacitive-type, or ultrasonic-type touch panels are used in devices such as ticketing machines, ATMs, game devices for video arcades, and the like, which many and unspecified persons use.

Although resistive-type touch panels have an overwhelming market share of 90% or more in LCD-mounted touch panels, a capacitive-type touch panel is employed in iPhones by Apple, Inc.

For resistive-types, capacitive-type and ultrasonic-type touch panels, a certain amount of conductor and inductor materials are added on the surface thereof. In particular, semiconductor films, such as indium tin oxide (ITO) film, and the like, are used in resistive-type and capacitive-type touch panels, and thus the reflection ratio thereof is high.

Laminates are not added on the surface of an optical-type touch panel and optically advantageous.

In general, resistive-type touch panels have a pressure sensor between electrodes, which is driven according to the principle of sensing micro-pressure, and are advantageous in that the panels have low costs compared to capacitive-type touch panels and are excellent in document preparation and handwriting recognition. However, the resistive-type touch panels are disadvantageous in that the external appearance thereof is easily damaged and multi-touch tasks are difficult for the panels to perform.

On the contrary, capacitive-type touch panels are driven according to the principle of recognizing micro-electric current of a human body, and are advantageous in that the panels are excellent in response speed and scratch resistance, capable of performing multi-touch tasks, and high in transmittance due to a structure of responding to electric current. However, the capacitive type panels are disadvantageous in that the panels have high manufacturing costs and are poor in document preparation and handwriting recognition.

In capacitive-type touch panels, PET film or glass may be used as a protective layer, and in particular, tempered glass is used in glass-type capacitive-type touch panels.

Depending on the kinds and manufacturers of display products using a capacitive-type touch panel, there are differences in structure and manufacturing process thereof. However, usually on tempered glass, electrode patterns using ITO are formed, or Bezel patterns for hiding the circuit wiring around an input unit are formed on tempered glass.

Bezel patterns to be formed on tempered glass of a touch panel may be formed by using a photolithography method or a screen printing method in the related art.

However, when the photolithography method is used, a uniform and precise Bezel pattern may be obtained, but the method includes processes of coating-exposure-development-sintering, and thus requires high costs.

In particular, after a pattern is formed on a large-size tempered glass substrate, it is impossible to cut the tempered glass substrate into a desired size and shape and use it. Thus, manufacturing is carried out by using a sheet of each glass substrate which has been subjected to tempering treatment after the glass is already cut into a specific standard and size, thereby causing a very inefficient manufacturing of the above.

Further, when screen printing is used, Bezel patterns are advantageous in that the patterns may be readily formed at a very fast speed, but disadvantageous in that the patterns have a thickness of 5 μm or more and are poor in thickness uniformity.

SUMMARY OF THE INVENTION

The present invention has been made in an effort to provide a method for producing two or more patterned substrates, which is efficient and has a simple process, and an apparatus for producing two or more patterned substrates.

An exemplary embodiment of the present invention provides a method for producing two or more patterned substrates, including steps of:

1) disposing at least two substrates on a substrate stage;
2) disposing a printing plate including at least two engraved pattern units corresponding to a pattern unit to be formed on a substrate, on a printing plate stage;
3) applying ink on a printing roll;
4) bringing the printing roll with the ink applied thereon into contact with the printing plate to form at least two pattern units on the printing roll; and
5) transferring the at least two pattern units on the printing roll to at least two substrates to be printed, respectively, as one process.

Another exemplary embodiment of the present invention provides an apparatus for producing two or more patterned substrates, including:

a printing roll;
a coater for applying ink on the printing roll;

a printing plate including at least two engraved pattern units corresponding to a pattern unit to be formed on a substrate to be printed;

a stage supporting the printing plate; and a stage supporting two or more substrates to be printed.

When a pattern is formed by the method for producing two or more patterned substrates according to the present invention, an effect capable of solving a problem that it is not easy to cut the pattern by scribing after two or more patterns are formed on a large size substrate is provided.

When a pattern is formed by the method for producing two or more patterned substrates according to the present invention, an effect capable of solving an inefficiency when the forming of a pattern on a small size substrate is repeated is provided.

DETAILED DESCRIPTION

Hereinafter, exemplary embodiments of the present invention will be described in detail.

A reverse offset printing process is a method for forming a micro-pattern in the manner of applying ink on a blanket, removing an unwanted pattern portion by a printing plate, and then transferring the pattern portion remaining on the blanket to a substrate.

The reverse offset printing process has been attempted to be applied to the formation of a color filter, an electromagnetic shielding filter (EMI filter), a TFT interconnection, a micro pattern substrate, and the like.

When the reverse offset printing process is used, a uniform and precise pattern may be obtained, and a method for forming a pattern, which is capable of producing many substrates in one process may be provided.

Figure 1:
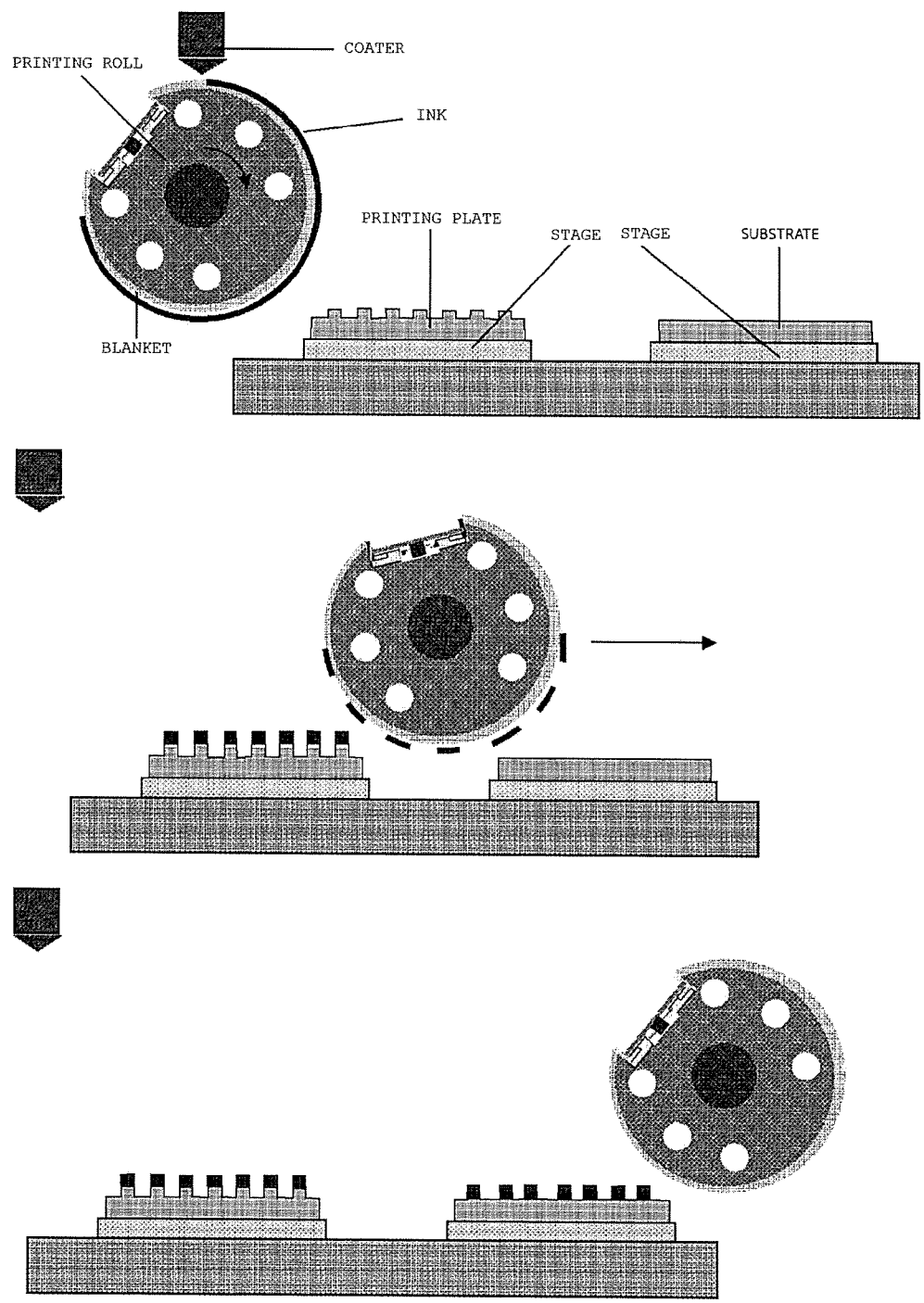
FIG. 1 is a view schematically illustrating a reverse offset printing process.

A general method of the reverse offset printing process is shown in the following FIG. 1.

The reverse offset printing process may be used, for example, in the formation of a black matrix pattern for a touch panel. The black matrix pattern for a touch panel is a very simple pattern compared to a black matrix for LCD, and thus may be easily formed through the reverse offset printing process.

There are largely two methods according to the size of a substrate when the reverse offset printing process in the related art is used. One is a method when a large size substrate is used, and the other is a method when a small size substrate is used.

Figure 2:
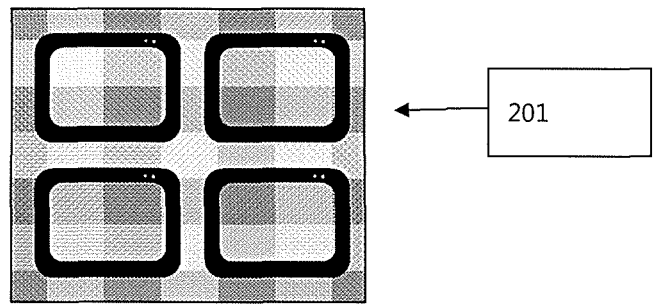
FIGS. 2 and 3 are views illustrating a substrate on which a Bezel pattern(s) are formed by using a black matrix ink according to a method in the related art.

First, FIG. 2 is a view illustrating a substrate 201 to be printed on which a pattern is formed when a large size substrate is used.

When a large size substrate is used, two or more pattern units may be manufactured in one process as in the present invention. However, when a large size substrate is used, a plurality of pattern units are formed on a substrate, and the process is a cumbersome work, which includes cutting a pattern by scribing after the pattern is formed.

In addition, when the pattern is formed and then subjected to a scribing process, there is a problem in that the pattern formed may be damaged, and the like.

In particular, when a tempered glass substrate is used as a substrate for a touch panel, the following problem occurs.

Tempered glass may be made by a heat treatment method, so-called tempering, for heating and compressing a plate glass at a temperature of from 670° C. to 710° C., which is close to the softening temperature thereof, rapidly cooling the plate glass with cooling air to compress and modify the surface portion of the glass, and modifying the internal tensile force.

Furthermore, tempered glass may also be made by a chemical treatment method based on a so-called ion exchange method for generating compressive force by dipping glass in molten salt to substitute small ions on the glass surface with large ions in the molten salt and filling the glass surface.

Further, tempered glass may also be made by a laminate reinforcement method for overlapping several sheets of glass to fold into a sandwich-like structure and to allow internal glass to contract more than external glass during cooling to apply compressive force on the external glass.

It is very difficult to cut the reinforced glass again by any of the methods mentioned above and use the glass. That is, glass needs to be cut into a predetermined size and shape before the glass is subjected to reinforcement treatment.

Compressive stress is formed on the surface of the reinforced glass so as to withstand an external load and tensile stress is formed inside the glass in order to compensate this. Thus, a balance is maintained.

When external cracking occurs due to cutting, the cracking is not progressing in a desired cutting direction but rather the glass instantaneously breaks into small pieces. Thus, in the manufacture of a touch panel, a plate glass cut into a predetermined shape and standard is typically subjected to the processing method to reinforce the plate glass and then used.

That is, when a large size substrate is used as in FIG. 2, it becomes difficult to produce a touch panel by using a reinforced glass substrate.

Figure 3:
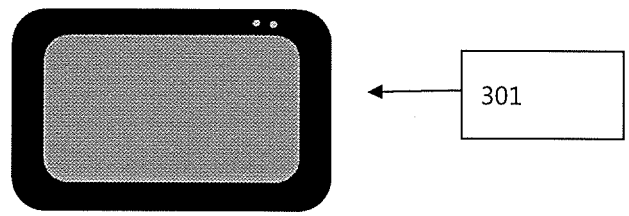

Second, FIG. 3 is a view illustrating a substrate 301 to be printed on which a pattern is formed when a small size substrate is used.

The small size substrate is proposed in order to overcome a problem occurring when the large size substrate is used, and a problem of cutting a substrate after the formation of a pattern may be overcome.

However, when a small size substrate is used, a pattern unit is formed on the substrate in one process, as shown in FIG. 3. In that case, a problem in that in performing mass production thereof, the efficiency is greatly deteriorated occurs.

Thus, the present invention provides a method for producing two or more patterned substrates and an apparatus for producing the same in order to show off only advantages of the use of a large size substrate and the use of a small size substrate.

Hereinafter, the present invention will be described in more detail as follows.

A method for producing two or more patterned substrates according to the present invention includes steps of:

1) disposing at least two substrates on a substrate stage;
2) disposing a printing plate including at least two engraved pattern units corresponding to a pattern unit to be formed on a substrate, on a printing plate stage;
3) applying ink on a printing roll;
4) bringing the printing roll with the ink applied thereon into contact with the printing plate to form at least two pattern units on the printing roll; and
5) transferring the at least two pattern units on the printing roll to at least two substrates to be printed, respectively, in one process.

The method for producing two or more patterned substrates according to the present invention includes steps of:

1) disposing at least two substrates on a substrate stage; and
2) disposing a printing plate including at least two engraved pattern units corresponding to a pattern unit to be formed on a substrate, on a printing plate stage.

1) The disposing of at least two substrates on a substrate stage and 2) the disposing of a printing plate including at least two engraved pattern units corresponding to a pattern unit to be formed on a substrate, on a printing plate stage may be interchanged in sequence.

An engraved pattern unit is formed on a printing plate in order to form a pattern unit on a printing roll.

The printing plate may be produced so as to have a groove shape having a plurality of pattern units on a substrate.

The method for producing patterned substrates according to the present invention is for manufacturing two or more patterned substrates in one process.

For this purpose, the printing plate also includes two or more engraved pattern units. The printing plate includes more specifically four or more engraved pattern units in terms of efficiency of producing patterned substrates.

Figure 4:
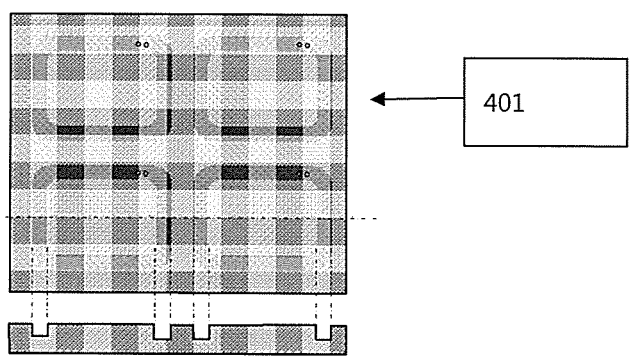
FIG. 4 is a plan view and a cross-sectional view of a printing plate on which grooves having a plurality of Bezel pattern shapes are formed.

FIG. 4 shows a plan view and a cross-sectional view of a printing plate 401 on which grooves having a plurality of Bezel pattern shapes are formed.

A substrate for producing the printing plate may be a glass substrate.

The method for producing the printing plate in step 2) may use a typical wet etching method for producing the printing plate by performing metal deposition, photoresist patterning, etching, and stripping and a dry etching method using laser ablation, laser cutting, and the like, and is not limited thereto.

Figure 5:
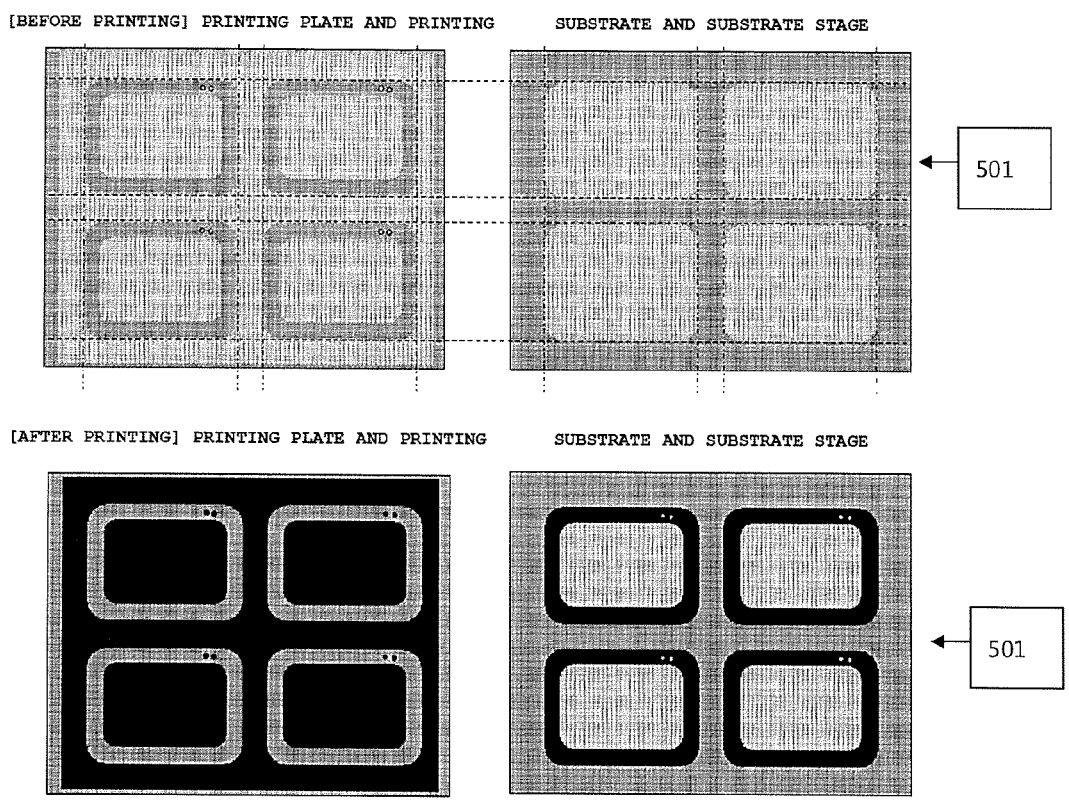
FIG. 5 is a view illustrating forms of a printing plate stage including a printing plate and a substrate stage including a plurality of substrates before and after printing.
Figure 6:
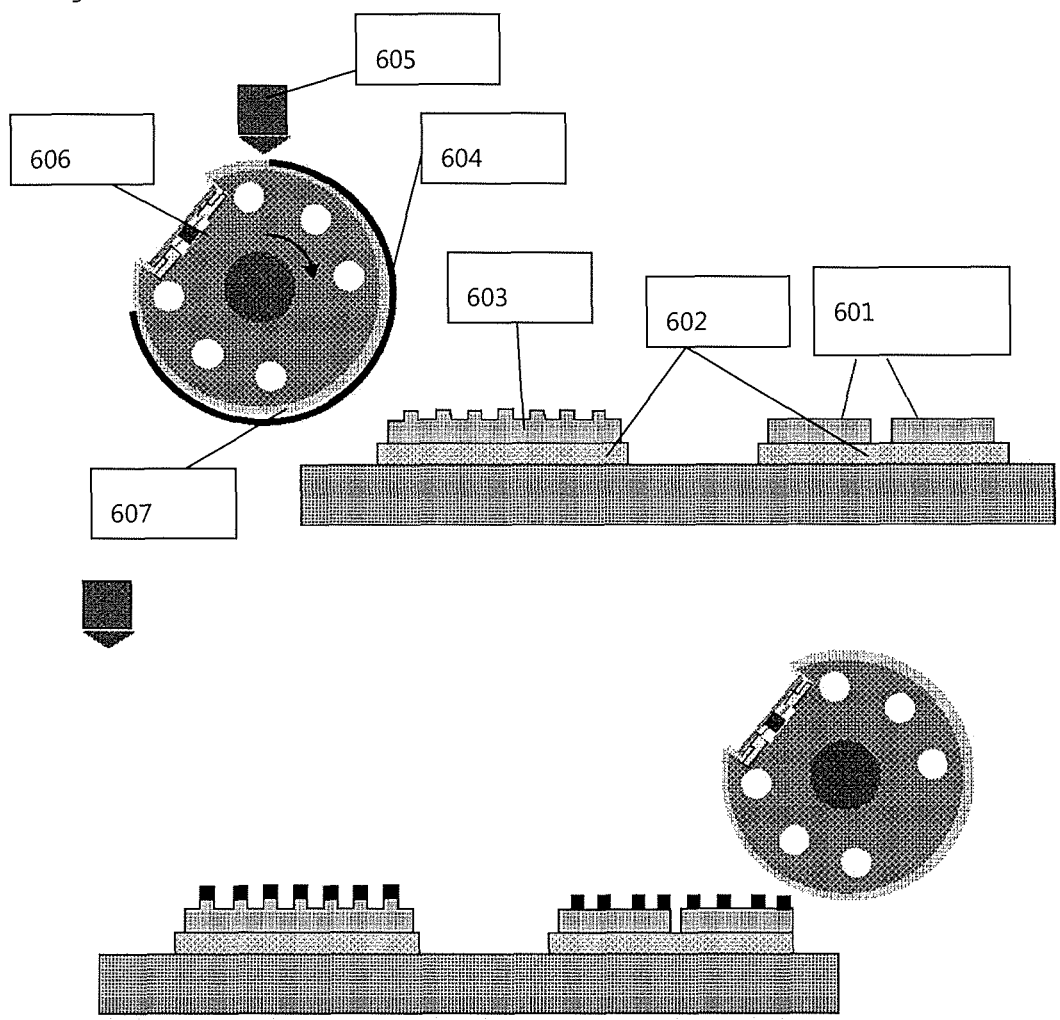
FIG. 6 is a view illustrating a process in which a plurality of substrates having Bezel patterns according to embodiments of the present invention are produced in one process.
Figure 7:
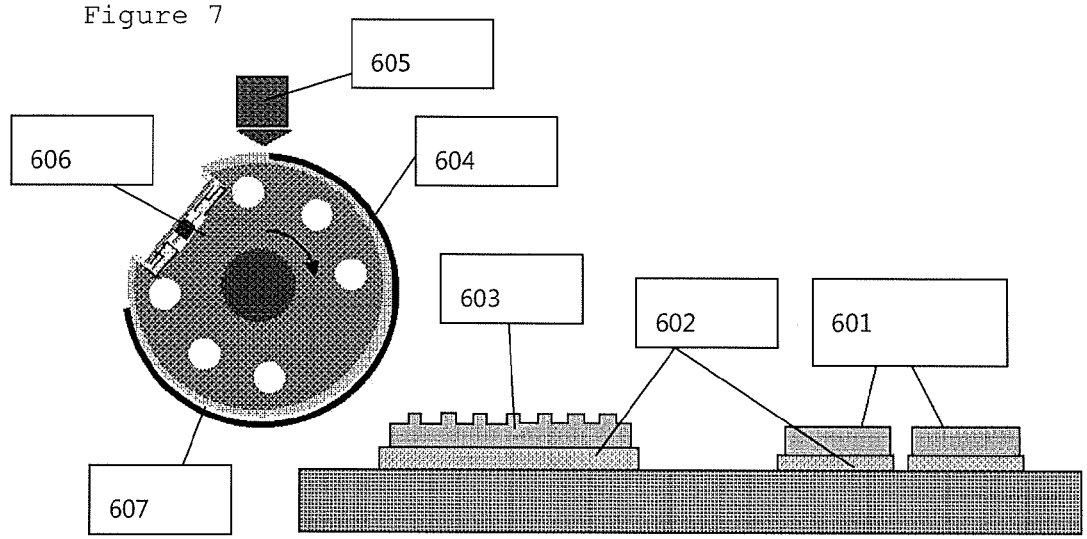
FIG. 7 is a view illustrating an apparatus for producing a substrate having Bezel patterns by forming a substrate on each of the bodies of a substrate stage composed of a plurality of bodies according to the exemplary embodiment of the present invention.

The substrate 601 may be disposed by raising a plurality of substrates on a substrate stage 501 composed of a body as shown in FIGS. 5 and 6, and may be disposed by raising each substrate on each of the substrate stages composed of a plurality of bodies, as shown in FIG. 7.

At this time, the substrate may be moved by using a robot arm.

Figure 8:
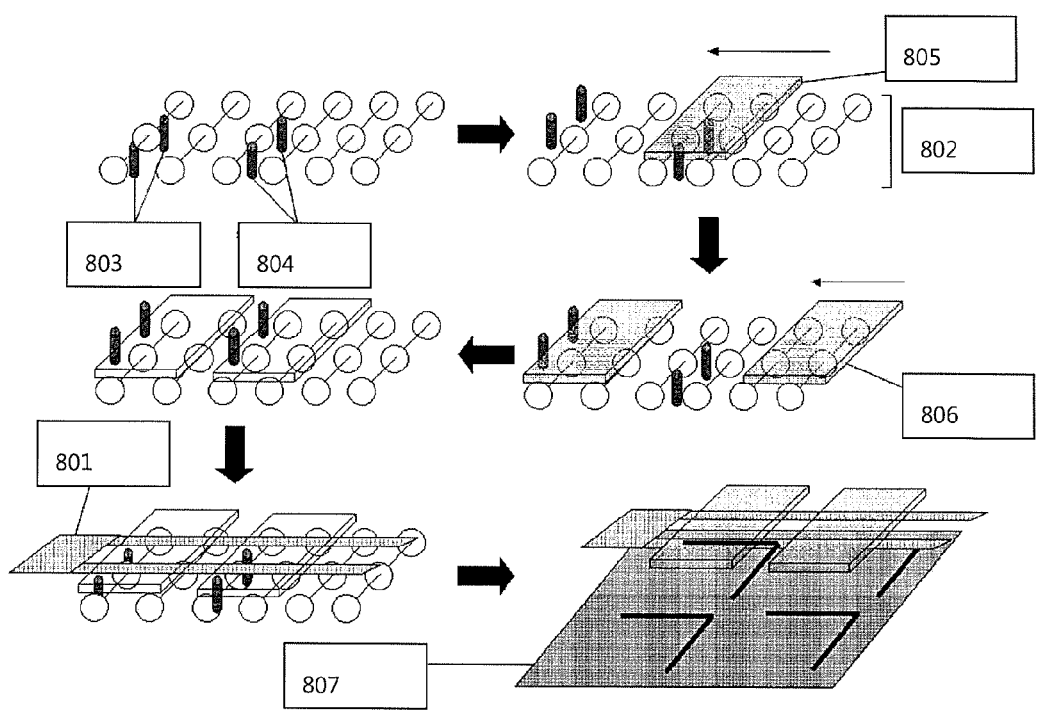
FIG. 8 is a view illustrating a procedure of using a robot arm to dispose a substrate on a substrate stage.

FIG. 8 is a view illustrating a procedure of using a robot arm 801 to dispose a substrate on a substrate stage.

In FIG. 8, a transport apparatus 802 is shown in a drawing showing a first procedure. In the transport apparatus, a roller which may move an object in one direction and a first group and a second group of aligner pins 803, 804 may be formed.

The aligner pin is a member which moves vertically to dispose an object to be transported at a specific position.

When a first substrate 805 is transported on the transport apparatus, the first group of aligner pins may be raised to dispose the first substrate at a specific position.

Further, when a second substrate 806 is transported on the transport apparatus, the second group of aligner pins may be raised to dispose the second substrate at another specific position.

Substrates disposed on each position in this way may be moved to specific positions on the substrate stage 807 by using a robot arm.

Step 1) may include aligning the substrate using zigs and aligners formed on the substrate stage and a control unit for controlling them.

The position of the substrate on the substrate stage may be aligned at a specific position by installing zigs and aligners on the substrate stage.

Unlike a technology in the related art, the present invention may print a pattern on two or more substrates in one process. Since a plurality of printing plates and substrates are present, it is important to arrange the printing plates and the substrates at exact positions.

The zig means a fixed member formed such that the substrate on the substrate stage may be placed at a specific position, and may have various forms.

In addition, the aligner means a member for aligning the position of the substrate, and the aligner may be operated to align the substrate so as to closely adhere to the zig.

The aligner may consist of a member having a rod shape, and the like, which moves forward and backward or left and right on the substrate stage, and a hole provided on the substrate stage, which allows the member to move vertically or left and right.

Figure 9:
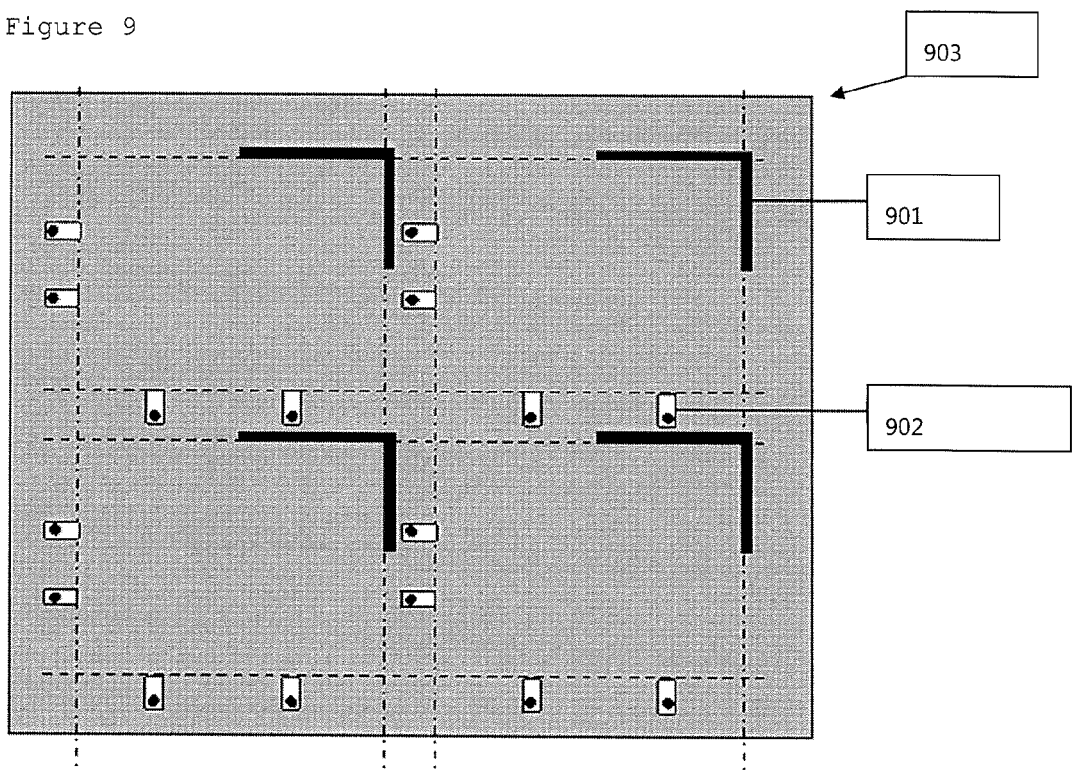
FIG. 9 is a plan view of a substrate stage including zigs and aligners according to the exemplary embodiment of the present invention.

FIG. 9 is a view illustrating a substrate stage 903 including zigs 901 and aligners 902.

Figure 10:
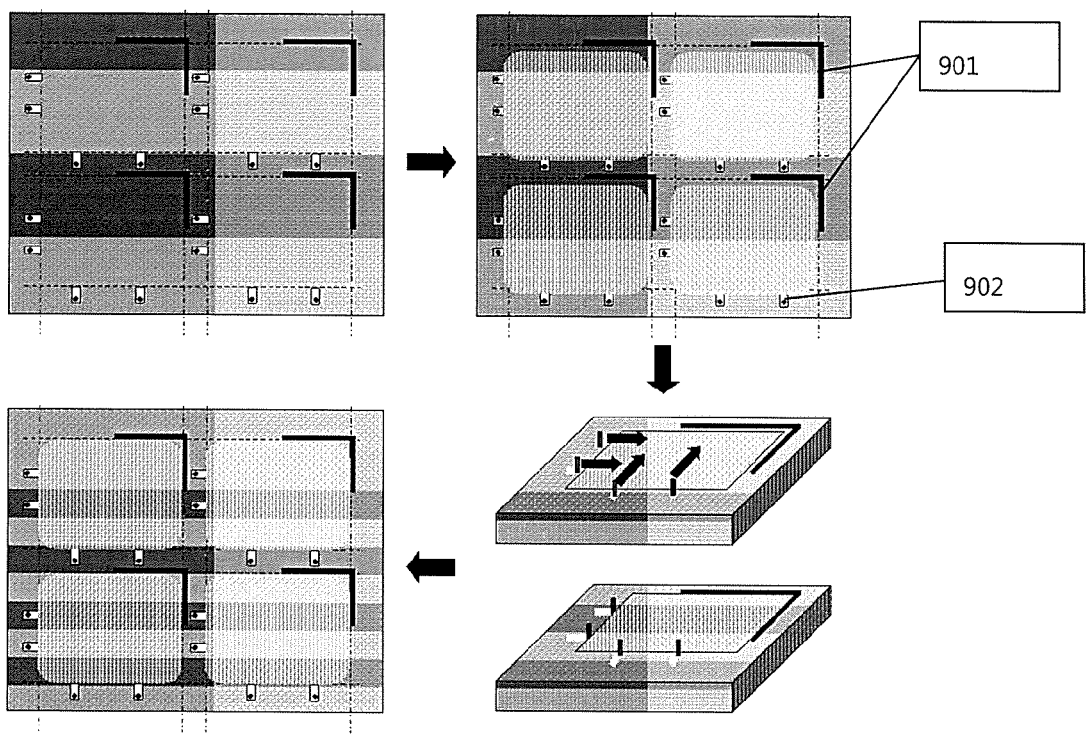
FIG. 10 is a view illustrating a procedure of parallelly arranging two or more substrates on a substrate stage according to the exemplary embodiment of the present invention.

FIG. 10 is a view illustrating a procedure of parallelly arranging two or more substrates on a substrate stage on which zigs 901 and aligners 902 are installed.

When the procedure is described by referring to FIG. 10, two or more substrates are transported on a substrate stage including zigs and aligners through a robot arm, and then the aligner is moved vertically or left to right to move the substrate so as to closely adhere to the zig.

Figure 11:
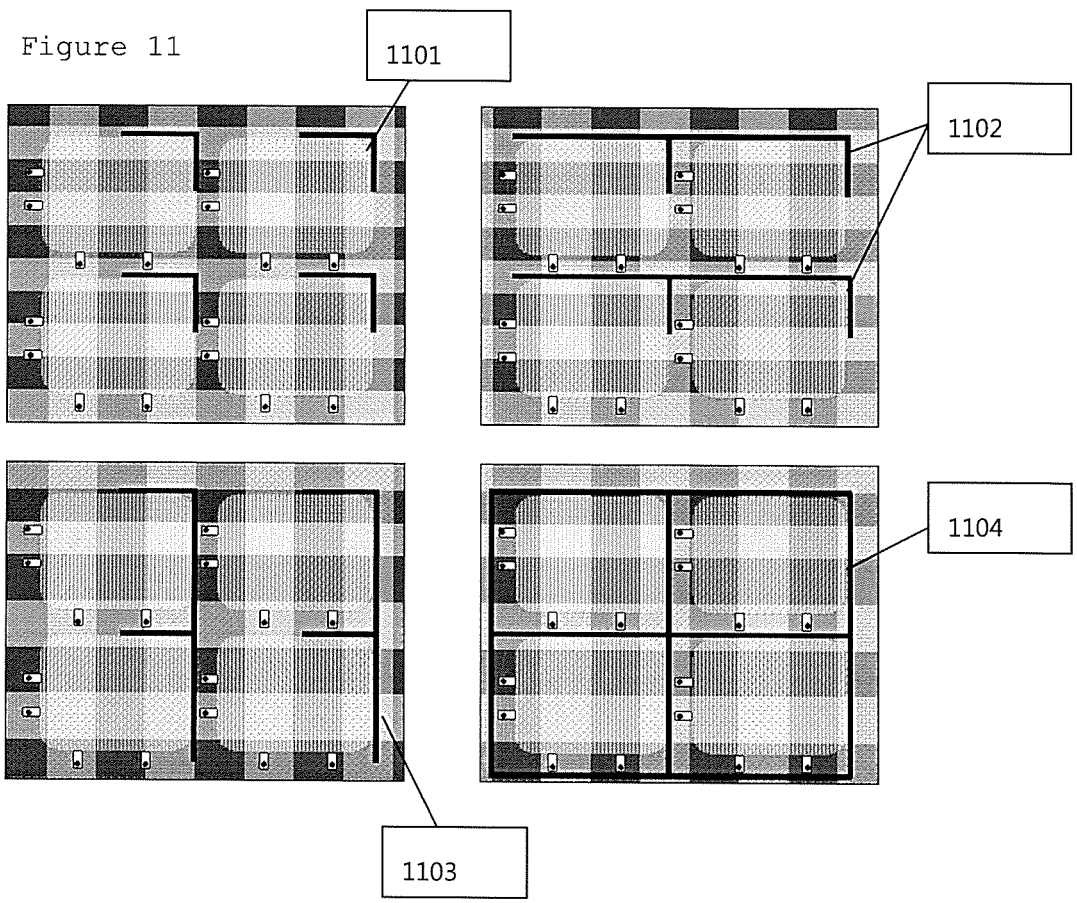
FIG. 11 is a view illustrating various forms of zigs according to the exemplary embodiment of the present invention.

FIG. 11 is a view illustrating various shapes of zigs 1101, 1102, 1103, 1104 according to the exemplary embodiment of the present invention.

The method for producing two or more patterned substrates according to the present invention includes 3) applying ink on a printing roll.

In applying ink on a printing roll, ink is applied on a blanket by using a coater. The blanket may be formed of a polydimethylsiloxane (PDMS) rubber material.

The ink applied on the printing roll may be an ink for color pattern and an ink composition for black matrix pattern. The ink applied on the printing roll may be an ink composition for black matrix pattern, which is used as a Bezel pattern to be formed on tempered glass of a touch panel. However, the ink is not limited thereto, and includes all ink used in the art.

A typical blanket is composed of a surface printing layer, a support layer, and a cushion layer, and may further include a primer layer in order to secure adhesive force between the layers. The surface printing layer is a layer on which ink is directly deposited to be transferred, and may be manufactured of PDMS.

The support layer serves to support the surface printing layer and the cushion layer, and may be manufactured of a PET film.

Furthermore, when the surface of the surface printing layer is not uniform, the cushion layer serves to compensate such a thickness difference, and may be manufactured of PDMS in the same manner as in the surface printing layer.

A typical slit coater may be used as a coater for applying ink on a printing roll.

For example, during the rotation of the printing roll at a speed of from 10 mm/s to 150 mm/s, the ink may be uniformly applied on the blanket while the ink is discharged through a slit coater.

The method for producing two or more patterned substrates according to the present invention includes 4) bringing the printing roll on which the ink is applied into contact with the printing plate to form at least two pattern units on the printing roll.

The printing roll is brought into contact with a printing plate on which two or more engraved pattern units are formed in the progressing direction to leave behind the ink of the pattern to be formed on a substrate to be printed on the printing roll.

The printing roll on which the ink is applied may be driven by performing rotation driving using a servo motor and linear driving using a linear motor simultaneously or separately.

After the application of the ink has been completed in step 3), the printing roll is linearly driven by a linear motor and moved in front of a printing plate stage. And then, the position of the printing roll is controlled such that the ink applied while the printing roll is rotated by the driving of the servo motor is transferred throughout the printing plate.

After that, the printing roll is allowed to roll and go while being brought into contact with the printing plate while the printing roll is moving both rotationally and linearly by simultaneously driving the servo motor and the linear motor of the printing roll.

At this time, the running speed by a linear movement of the printing roll is specifically from 10 mm/s to 200 mm/s.

In addition, the printing pressure is specifically in a range of from 10 μm to 50 μm for smooth transfer of the pattern.

Figure 12:
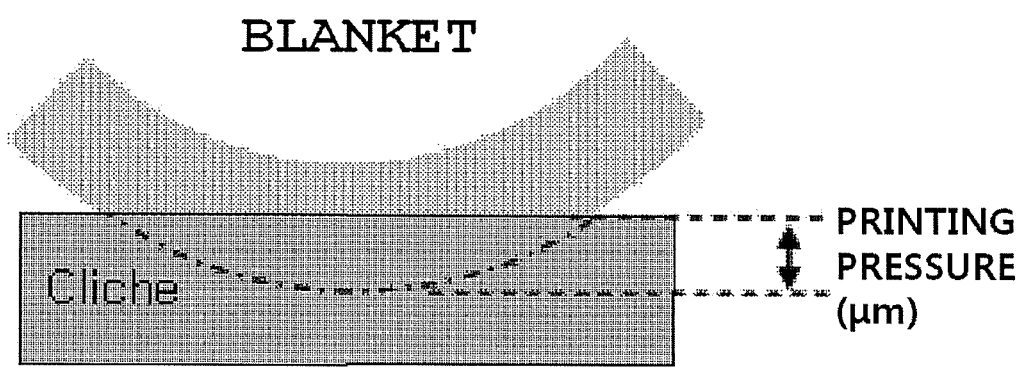
FIG. 12 is a view illustrating a printing pressure applied while a printing roll is moved on a printing plate or a substrate to transfer a pattern.

Herein, the printing pressure is represented by a depth pressed down by using a point at which the blanket of the printing roll touches the printing plate or the substrate as a basis (0 μm), as shown in FIG. 12. That is, the larger the depth pressed down, the larger printing pressure is applied.

The method for producing two or more patterned substrates according to the present invention includes 5) transferring the at least two pattern units on the printing roll to at least two substrates to be printed, respectively, in one process.

The unwanted pattern portion on the printing plate in step 4) is removed from the blanket, and then the printing roll is linearly driven by a linear motor and moved in front of the substrate stage. And then, the position of the printing roll is controlled such that the ink while the printing roll is rotated by the driving of the servo motor is transferred throughout the substrate in step 5).

After that, the printing roll is allowed to roll and go with being brought into contact with the substrate while the printing roll is moving both rotationally and linearly by simultaneously driving the servo motor and the linear motor of the printing roll.

At this time, the running speed by a linear movement of the printing roll is specifically from 10 mm/s to 200 mm/s.

Furthermore, the printing pressure is specifically in a range of from 10 μm to 50 μm for smooth transfer of the pattern.

The substrate is an object on which the pattern unit is printed, and may use a glass or plastic substrate.

In particular, in the case of a substrate for a touch panel, the substrate may be a tempered glass substrate.

In the touch panel, the substrate may be damaged by scratches caused by touch motion, and thus a highly scratch-resistant tempered glass and a protective film may be used.

The method for producing two or more patterned substrates of the present invention may additionally include, after a plurality of pattern units which have been subjected to the processes are transferred to the corresponding substrates to be printed, respectively, 6) sintering the substrate to which the pattern units are transferred.

The present invention may use two or more substrates such that each pattern unit may be transferred before the formation of the pattern and specifically four or more substrates, in order to show off only advantages of the use of a large size substrate and the use of a small size substrate.

The plurality of substrates are supported by a substrate stage composed of a body or a plurality of bodies.

FIG. 6 shows a plan view of a printing plate stage on which a printing plate is formed and a substrate stage on which a plurality of substrates are formed, and FIG. 7 is a view illustrating an apparatus which forms a substrate on each of substrate stages composed of a plurality of bodies. It is preferred that the substrate is a substrate for a touch panel.

Further, a material for the substrate may be tempered glass.

In addition, the pattern unit may be formed by using a black matrix.

Furthermore, the pattern unit may be a Bezel pattern of a touch panel.

In the case of the Bezel pattern, the pattern has a very simple shape, and thus may be readily formed through the reverse offset printing process.

Further, the present invention provides an apparatus for producing two or more patterned substrates, including a printing roll, a coater for applying ink on the printing roll, a printing plate including at least two engraved pattern units corresponding to a pattern unit to be formed on a substrate to be printed, a stage supporting the printing plate, and a stage supporting two or more substrates to be printed.

Referring to FIG. 6, the apparatus for producing two or more patterned substrates consists of a coater 605 applying ink 604 on a printing roll 606, the printing roll, a printing plate 603 and a printing plate stage 602 supporting the printing plate, a substrate, and a substrate stage 602 supporting the substrate.

The ink is applied on the printing roll by the coater, and the printing roll is brought into contact with a printing plate on which two or more engraved pattern units are formed in the progressing direction to leave behind the ink of the pattern to be formed on a substrate to be printed on the printing roll.

The printing roll, on which only the ink of the pattern to be formed on the substrate to be printed is left behind, is an apparatus that passes on the substrate and may transfer a patterned ink on the substrate.

The printing plate stage and the substrate stage may include two or more align keys, respectively.

The align key means a mark that recognizes positions such that in the movement of the printing plate stage and the substrate stage, the printing plate stage and the substrate stage may be arranged at the corresponding position, and both stages are moved to the corresponding positions after the relative positions of the printing plate stage and the substrate stage are recognized by using the align key.

Figure 13:
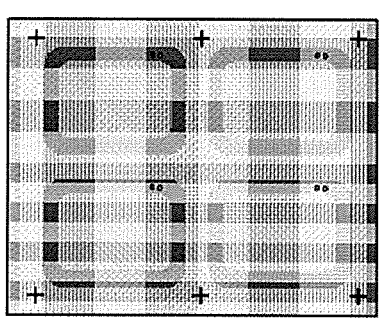
FIG. 13 is a plan view of a printing plate stage and a substrate stage including an align key according to the exemplary embodiment of the present invention.
Figure 13:
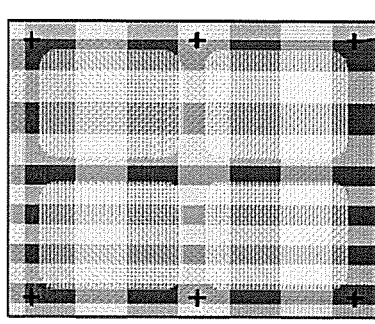
Figure 14:
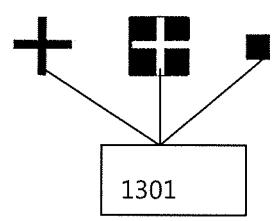
FIG. 14 is a view illustrating various forms of align keys according to the exemplary embodiment of the present invention.

At this time, for the align key 1301 installed on the printing plate stage and the substrate stage, two or more align keys may be installed and used, respectively, as shown in FIG. 13, and the shape thereof also may have various shapes, as shown in the following FIG. 14.

Further, the substrate stage may include zigs, aligners, and a control unit for controlling them.

The zig is an element formed so as to place the substrate at a specific position, and thus the height of the zig may be formed by considering the thickness of the substrate. A substrate having a substrate thickness of from 200 μm to 1,000 μm may be used, and thus the zig may be formed so as to have a height of from 100 μm to 500 μm.

When the height of the zig is 100 μm or more, the zig is not bent, and thus the zig is readily installed on the substrate stage. In addition, when the zig has a height of 500 μm or less, the damage and contamination of the blanket of the printing roll caused by contact of the blanket of the printing roll with the zig during pattern transfer may be prevented.

As a material for the zig, stainless steel (SUS) which is not affected by organic solvents may be used.

The control unit is a means for controlling zigs and aligners, and may use a control unit which is used in the art.

The method for producing patterned substrates according to the present invention is for manufacturing two or more patterned substrates in one process, and two or more engraved pattern units are also included in the printing plate for this purpose.

The printing plate more specifically includes four or more engraved pattern units in terms of efficiency of producing patterned substrates.

The substrate to be printed may be a substrate for a touch panel.

Further, a material for the substrate to be printed may be tempered glass.

In addition, the pattern unit may be formed by using a black matrix.

Furthermore, the pattern unit may be a Bezel pattern of a touch panel.

The stage supporting the substrate to be printed may be composed of a body so as to support two or more substrates to be printed, but also may include the same number of bodies as the number of substrates to be printed.

FIG. 6 shows an apparatus composed of a body such that the substrate stage supports two or more substrates, and FIG. 7 shows an apparatus including substrate stages having the same number of bodies so as to correspond to a plurality of substrates.

What is claimed is:

1. A method for producing two or more patterned substrates, comprising steps of:
   1) disposing at least two substrates on a substrate stage;
   2) disposing a printing plate including at least two engraved pattern units, each of the at least two engraved pattern units corresponding to a pattern unit to be formed on a respective one of the at least two substrates, on a printing plate stage;
   3) applying ink on a printing roll;
   4) bringing the printing roll with the ink applied thereon into contact with the printing plate to form at least two pattern units on the printing roller; and
   5) transferring the at least two pattern units on the printing roll to the at least two substrates to be printed, respectively, in one process.

2. The method of claim 1, wherein the at least two substrates in step 1) are moved by using a robot arm.

3. The method of claim 1, wherein step 1) comprises aligning the at least two substrates using zigs and aligners formed on the substrate stage.

4. The method of claim 1, wherein the printing plate comprises at least four of the engraved pattern units.

5. The method of claim 1, wherein the printing roll in step 4) or step 5) is driven by performing a rotation driving using a servo motor and a linear driving using a linear motor simultaneously or separately.

6. The method of claim 1, wherein the at least two substrates are substrates for a touch panel.

7. The method of claim 1, wherein the at least two substrates are made of tempered glass.

8. The method of claim 1, wherein the pattern unit is formed by using a black matrix ink.

9. The method of claim 1, wherein the pattern unit is a Bezel pattern of a touch panel.

10. The method of claim 1, further comprising:
    6) sintering the at least two substrates on which the pattern unit is transferred.

11. An apparatus for producing two or more patterned substrates, comprising:
    a printing roll;
    a coater for applying ink on the printing roll;
    two or more substrates to be printed, patterned in one process;
    a printing plate comprising at least two engraved pattern units, each of the at least two engraved pattern units corresponding to a pattern unit to be formed on a respective one of the two or more substrates to be printed;
    a printing plate stage supporting the printing plate;
    and a substrate stage supporting the two or more substrates to be printed.

12. The apparatus of claim 11, wherein the printing plate comprises at least four of the engraved pattern units.

13. The apparatus of claim 11, wherein the two or more substrates to be printed are substrates for a touch panel.

14. The apparatus of claim 11, wherein the two or more substrates to be printed are tempered glass.

15. The apparatus of claim 11, wherein the pattern unit is formed by using a black matrix ink.

16. The apparatus of claim 11, wherein the pattern unit is a Bezel pattern of a touch panel.

17. The apparatus of claim 11, wherein the printing plate stage and the substrate stage comprise two or more align keys, respectively.

18. The apparatus of claim 11, wherein the substrate stage comprises zigs, aligners, and a control unit for controlling them.

19. The apparatus of claim 18, wherein a material for the zig is stainless steel (SUS).

20. The apparatus of claim 18, wherein the zig has a height of from 100 μm to 500 μm.

21. The apparatus of claim 11, wherein the substrate stage supporting the two or more substrates to be printed is composed of a body so as to support two or more substrates to be printed.

22. The apparatus of claim 11, wherein the substrate stage supporting the two or more substrates to be printed comprises the same number of bodies as the number of substrates to be printed.

\* \* \* \* \*